Oct. 24, 1939.   A. MASSA   2,176,914
WHEEL
Filed Dec. 29, 1936
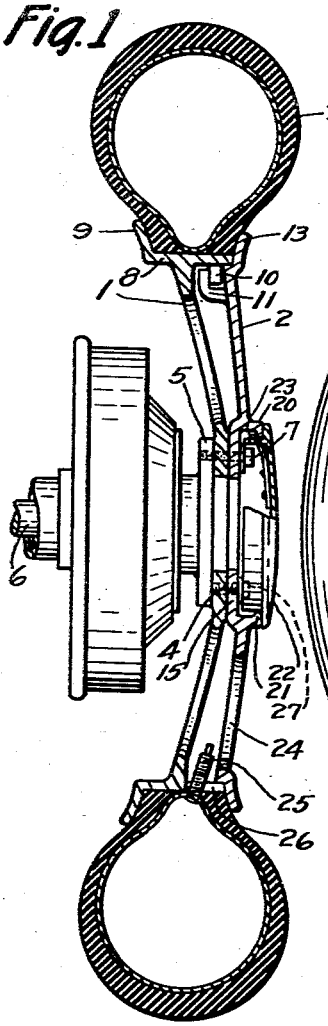
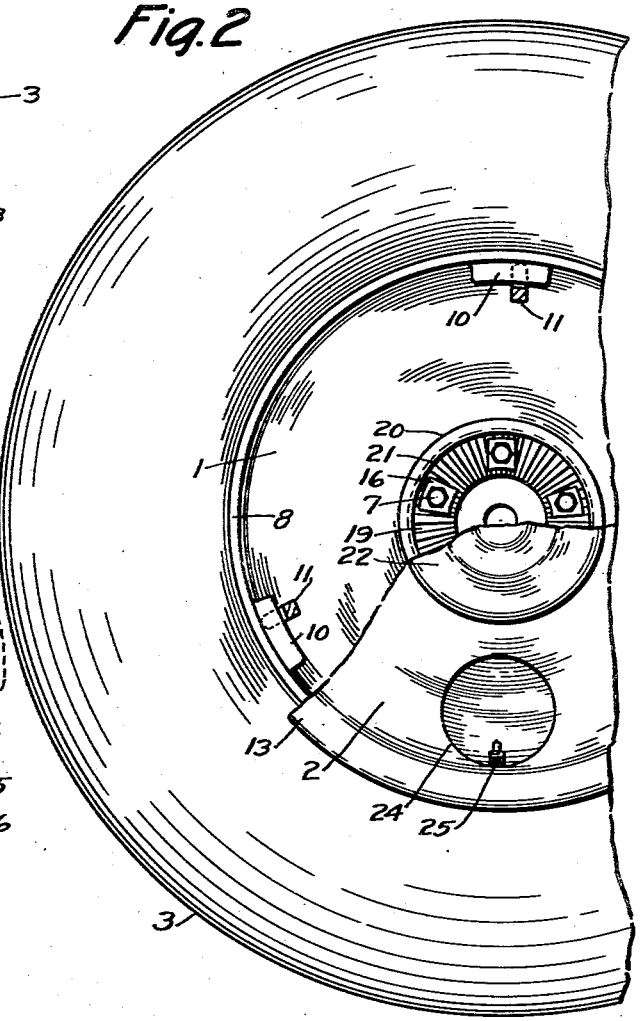
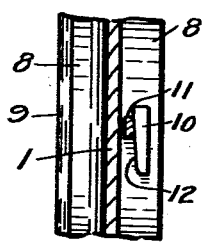
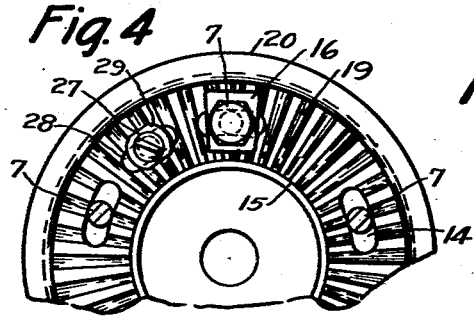
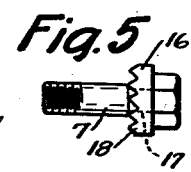
INVENTOR.
Anthony Massa
BY James Harrison Bowen
ATTORNEY.

Patented Oct. 24, 1939

2,176,914

UNITED STATES PATENT OFFICE 2,176,914

WHEEL

Anthony Massa, Jersey City, N. J.

Application December 29, 1936, Serial No. 118,105

1 Claim. (Cl. 301—9)

The purpose of this invention is to improve the construction of wheels of the type particularly used for motor vehicles, by holding the tire on the rim with a removable continuous side plate, which may readily be removed to remove and repair the tire, and which also permits the entire wheel to be readily removed and replaced.

The invention is a wheel having a rim at the periphery of a disc, with a flat surface upon which a tire may be mounted, and having a permanent flange at one side, and a removable flange at the other, in which the removable flange is secured in place by a wedge action, and held by bolts, and also in which the bolts hold the removable flange and also the wheel upon a hub of the axle.

Wheels of different types have been used, and many have been provided that facilitate the removal of a tire, but these involve relatively complicated structures, and it has been found desirable to simplify the construction of wheels, making it possible to readily remove and replace a tire, in which the entire wheel structure comprises two discs, one having a rim upon which a tire may be mounted, and the other having a flange for holding the tire on the rim, and in which the disc with the flange may readily be removed with the wheel when it is desired to change the tire and wheel, or independent of the wheel when it is desired to change the tire.

The object of the invention, is therefore to simplify the construction of wheels of the type used for motor vehicles, and at the same time facilitate the mounting of a tire thereon, so that the tire may readily be changed.

Another object is to provide a motor vehicle wheel in which the tire is clamped on a wheel rim by a wedge action.

Another object is to provide a motor vehicle wheel in which the tire may be held on the wheel, and the wheel on the axle, by the same bolts.

Another object is to provide a motor vehicle wheel having an outer plate and flange for holding the tire on the wheel, in which the outer plate is held by a wedge action, and in which means is provided on bolt heads by which the wheel and flange are held to compensate for the movement of the flange in relation to the wheel.

A further object is to provide a wheel structure comprising two parts, one upon which a tire is mounted, and the other adapted to hold the tire in place, in which independent locking means is provided for locking the tire in place, and common holding means is provided for holding the wheel and tire holding means.

And a still further object is to provide an improved motor vehicle wheel, in which the tire may readily be removed and replaced, which is of a simple and economical construction.

With these ends in view the invention embodies a wheel comprising an inner disc having a rim at the outer edge with a flange on the inner side, and having a flat surface adapted to hold a pneumatic tire, and another disc with a flange cooperating with the said rim, and adapted to hold the tire thereon, in which the second disc forms a face plate and is provided with lugs engaging wedge shaped projections on the inner surface of the rim of the former disc, both of said discs adapted to be bolted to the axle of a motor vehicle by the same bolts, and said outer disc having a hub with a readily removable hub cap covering said bolts.

Other features and advantages of the invention will appear from the following description, taken in connection with the drawing, wherein:

Figure 1 is a view showing a cross section through the wheel.

Figure 2 is a view showing a side elevation of the outside of the wheel with parts broken away.

Figure 3 is a detail showing the wedge shaped locking lugs on the rim.

Figure 4 is an enlarged view of the hub of the wheel showing grooves in which locking members on the holding bolts may be held.

Figure 5 is a view showing one of the bolts with the locking member thereon.

In the drawing the wheel is shown as it may be made, wherein numeral 1 indicates the wheel, numeral 2 the outer disc or face plate, and numeral 3 a tire adapted to be mounted upon said wheel.

The wheel 1 is preferably formed of a disc with openings extending therethrough, however, it will also be understood that it may be formed with spokes, and in either design the inner portion is provided with a hub 4 which may be attached to a flange 5 on an axle 6 of a motor vehicle by bolts 7, or by any suitable means. The wheel is also provided with a complementary section 2 which provides a flange for holding the outer or opposite side of a tire, and this section is provided with a hub through which it may be independently bolted to the wheel 1 to form a complete wheel. The periphery of the wheel is provided with a rim 8 having an inner flange 9, and it will be noted that the tire 3 may be mounted upon the rim 8, as shown. The inner surface of the rim 8 is provided with tapering lugs 10, and these may be engaged by fingers 55

11 extending inward from the disc 2. These lugs may be formed as shown in Figure 3, in which their inner surfaces 12 are inclined, and it will be noted that when assembling the disc 2 on the wheel 1 the disc is turned so that the fingers 11 will move upward on the inclined surfaces 12, thereby clamping the disc 2, and the flange 13, forming the outer edge thereof against the tire 3, and rim 8. The slope of the surfaces 12 is positioned so that the rotation of the discs 2 will be opposite to that of the wheels with the vehicle upon which the wheels are mounted moving forward, and with the disc 2 clamped in place and held by bolts 27 to the wheel 1, the bolts 7 may then be inserted through slotted holes 14 in the hub 15 of the disc 2, with the bolts passing through round holes in the hub 4 of the wheel 1, thereby securing the wheel on the axle of the vehicle.

In order to lock the disc 2 in relation to the bolts, lock washers 16 are rotatably mounted in recesses 17 on the bolts 7, and these washers are provided with teeth 18 that correspond with and engage teeth 19 in the hub 15 of the disc 2, so that as the bolts are tightened, the washers 16 lock and hold the disc 2 in relation to the wheel 1, and flange 5. It will be understood, however, that any other means may be used for locking the disc in relation to the wheel or bolts.

The hub 15 is also provided with a cylindrical flange 20 having an inwardly extending lip 21, and this is provided for holding a hub cap 22 having spring engaging members 23 similar to hub caps now in use. It will be noted, therefore, that with the wheel placed upon the axle, and the disc 2 clamped in place, the bolts may be placed through the hubs 4 and 15, and screwed into the flange 5, and when the bolts are in place the cap 22 may be snapped in the outer hub, completing the wheel. The washers 16 or any other means may be used for locking the disc 2 in relation to the wheel.

The disc 2 may also be provided with openings 24, as indicated in Figure 1, providing access to a valve 25 extending through a slot 26 in the rim 8. The valve may, however, be arranged in any other manner or any means may be provided facilitating access thereto. The disc 2 may also be held to the wheel 1 by auxiliary bolts 27, in slots 28, and these may have washers 29, similar to the washers 16, thereby holding the outer part 2 to the part 1, independent of the bolts 7.

It will be understood that other changes may be made without departing from the spirit of the invention. One of which changes may be in the shape or design of the wheel or rim, another may be in the use of a face plate of any other type or design, another may be in the use of other means for locking the wheel and face plate upon the axle, and still another may be in the use of a wheel of this type for any other purpose.

The construction will be readily understood from the foregoing description. In use the wheel may be provided as shown and described, and ordinarily the wheel will be provided as a complete unit, so that when it is desired to use the wheel, the cap 22 may be removed, and the wheel may be bolted in place as a unit. Should it be desired to remove and replace a tire with the wheel in place, it is only necessary to remove the hub cap and bolts 7 and 27, and the disc 2 may then be readily removed by turning it so that the fingers 11 will slide off of the lugs 10, and with this removed the tire 3 may readily be removed from the rim 8, with the inner part 1 of the wheel remaining free upon the axle, or, should it be desired to hold this part rigid, the bolts 7 may be replaced through the hub 4. Any one may, therefore, readily change the tire without removing the entire wheel, and without forcing the tire over extending flanges. It is preferred to make the flange 13 of a relatively smaller diameter than the flange 9, so that in case of a flat tire, the wheel will travel on the flange 9 instead of on the removable flange 13. It will be understood that any number of bolts may be used that may be desired, and also that any number of the lugs 10 and fingers 11 may be used.

Having thus fully described the invention, what I claim as new and desire to secure by Letters Patent, is:

A combination wheel, of the type adapted to hold a pneumatic tire on a rim thereof, comprising an inner circular member having a hub at the center and a rim adapted to hold a tire extending completely around the periphery, a permanent flange on the inner side of said rim, a removable flange at the opposite side of said rim and forming the periphery of an outer circular member also having a hub portion registering with the hub of the said former section and adapted to be bolted therewith to a flange on an axle upon which the wheel may be mounted, tapering latches securing the outer part of the outer section to the rim of the inner section with a binding movement, and a plurality of bolts securing the two sections to the said flange of the axle; said device characterized in that the hubs of both the outer and inner sections of the said wheel are provided with holes through which the said sections are bolted to the said flange with the holes in the hub of the outer section slotted, and also in that the outer surface of said outer section is radially grooved to receive similarly grooved washers on the said bolts, providing adjusting means and also positive holding means between the two sections.

ANTHONY MASSA.